United States Patent Office 2,695,302
Patented Nov. 23, 1954

2,695,302

1,4,5 TRIHALO-HYDROXY ANTHRAQUINONE

Alfred F. Schneid, Jersey City, N. J., and Paul Resnick, Brooklyn, N. Y., assignors to Interchemical Corporation, New York, N. Y., a corporation of Ohio No Drawing. Application February 15, 1952, Serial No. 271,854

2 Claims. (Cl. 260—383)

This invention relates to the new product 1,4,5-trichloro-8-hydroxy anthraquinone.

We have discovered that p-chloro-phenol can be condensed with 3,6-dichloro-phthalic anhydride to yield 1,4,5-trichloro-8-hydroxy anthraquinone. Presumably, the reaction is a two-step procedure, resulting first in the formation of 2-hydroxy-5-chloro-o-benzoyl benzoic acid, and then in a ring closure according to the following equations:

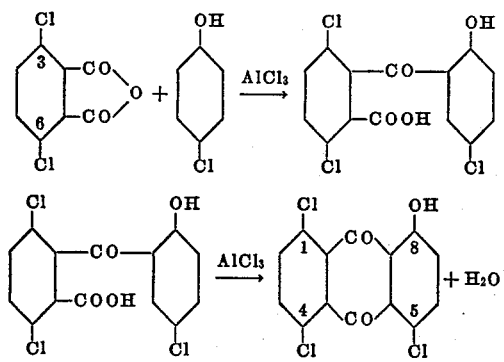

The aluminum chloride partakes in the reaction by forming additive compounds which decompose upon drowning in an acidified aqueous bath, causing the condensation product to precipitate. After recrystallization the latter proves to have a melting point of 205° C., and a chlorine content of 31.54 per cent, which compares favorably with the calculated amount of chlorine in trichloro-hydroxy anthraquinone. The structure of the new product is ascertained by hydrolysis in concentrated sulfuric acid which causes replacement of the chlorine atom in the 5-position by a hydroxyl group and results in a reddish-brown product the melting point of which, after recrystallization from xylol, is identical with that of dichloro-quinizarin (275.5° C.).

The following example illustrates the manner of producing 1,4,5-trichloro-8-hydroxy anthraquinone:

120 parts anhydrous aluminum chloride and 24 parts sodium chloride are mixed and heated to 150° C. To the resulting melt is added, over a period of 15-20 minutes, a mixture of 21.6 parts 3,6-dichlorophthalic anhydride and 12.85 parts p-chlorophenol. During this addition the temperature is raised to 200-220° C. while continuously stirring and is held at this level for about three hours. After cooling the melt (which sets at about 150° C.), the mass can be broken up and boiled in water which has been strongly acidified with hydrochloric acid in order to break the alumina-anthraquinone complex and to precipitate the latter. A more practical way is the addition of about 1 per cent of sodium fluoride to the reaction mixture. As a result of this addition the setting point is lowered to about 80-100° C. which permits transferring the partly cooled melt through pipes without clogging them, and drowning in another vessel containing a hydrochloric acid solution of 5-10 per cent. The precipitate which forms in the drowning solution is filtered off, washed until free of acid, and dried at 50-100° C. The yield exceeds 93 per cent of the theoretical.

The replacement of 3,6-dichloro-phthalic anhydride by 3,6-dibromo-phthalic anhydride results in the mixed 1,4-dibromo-5-chloro-8-hydroxy anthraquinone. Generally speaking, any of the chlorines of the herein described product can be replaced by any of the other halogens.

We claim:

1. A product having the following chemical structure:

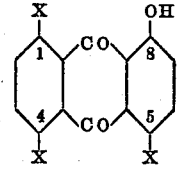

wherein X represents a member of the group consisting of bromine and chlorine.

2. 1,4,5-trichloro-8-hydroxy anthraquinone.

References Cited in the file of this patent

UNITED STATES PATENTS

| Number | Name | Date |
|---|---|---|
| 1,790,915 | Gubelmann et al. | Feb. 3, 1931 |

FOREIGN PATENTS

| Number | Country | Date |
|---|---|---|
| 8,503 | Great Britain | of 1903 |
| 15,058 of 1914 | Great Britain | Aug. 7, 1914 |
| 282,493 | Germany | Mar. 6, 1915 |

OTHER REFERENCES

Houben, Das Anthrracen and die anthrachinone, page 390, 1929.

Elsevier's Encyclopedia, vol. 13, page 504 (1946).